(12) United States Patent
Xu et al.

(10) Patent No.: US 12,337,472 B1
(45) Date of Patent: Jun. 24, 2025

(54) FLEXIBLE SENSOR AND METHOD OF DETECTING BIAXIAL WRIST JOINT MOTION, AND ROBOTIC ARM

(71) Applicant: Hangzhou Dianzi University, Hangzhou (CN)

(72) Inventors: Ming Xu, Hangzhou (CN); Hui Liu, Hangzhou (CN)

(73) Assignee: Hangzhou Dianzi University, Hangzhou (CN)

( * ) Notice: Subject to any disclaimer, the term of this patent is extended or adjusted under 35 U.S.C. 154(b) by 0 days.

(21) Appl. No.: 19/013,080

(22) Filed: Jan. 8, 2025

(30) Foreign Application Priority Data

Aug. 29, 2024 (CN) .......................... 202411196770.8

(51) Int. Cl.
*B25J 19/02* (2006.01)
*B25J 17/02* (2006.01)

(52) U.S. Cl.
CPC ............. *B25J 19/021* (2013.01); *B25J 17/02* (2013.01)

(58) Field of Classification Search
CPC ........ B25J 9/1694; B25J 9/1682; B25J 9/162; B25J 9/042; B25J 9/163; B25J 11/00; B25J 9/1674; B25J 9/161; B25J 11/005; B25J 11/008; B25J 19/02; B25J 9/0006; G05B 2219/45083; G05B 19/231; G05B 2219/34027; Y10S 901/08; B23Q 35/128; B65H 2553/41; H02K 41/02; H02P 6/006; H02P 25/06; G02B 26/00; A61B 2090/309; A61B 2090/3614; A61B 2560/0462

USPC ...... 318/568.11, 568.12, 568.2, 568.21, 574, 318/577, 625, 640, 687; 901/29, 30, 2, 8, 901/15, 32, 47

See application file for complete search history.

(56) References Cited

U.S. PATENT DOCUMENTS 9,120,233 B2 * 9/2015 Moore ................... B25J 13/086

FOREIGN PATENT DOCUMENTS

| CN | 105352554 B | 2/2016 |
|---|---|---|
| CN | 212151614 U | 12/2020 |
| CN | 112629399 B | 4/2021 |
| CN | 114043793 A | 2/2022 |
| CN | 220142451 U | 12/2023 |
| CN | 118209056 B | 6/2024 |
| CN | 118288316 A | 7/2024 |
| WO | 2020181790 A1 | 9/2020 |

* cited by examiner

*Primary Examiner* — Antony M Paul
(74) *Attorney, Agent, or Firm* — JEEN IP LAW, LLC

(57) ABSTRACT

A flexible sensor and a method of detecting biaxial wrist joint motion and a robotic arm are provided; the flexible sensor of detecting biaxial wrist joint motion includes a light-proof sleeve, a protective layer, a strip-shaped transparent conductive hydrogel, a light intensity sensor, a light source, and a resistance detection module; the transparent conductive hydrogel is arranged in an inner cavity of the light-proof sleeve; the protective layer is arranged between an inner side wall of the light-proof sleeve and the transparent conductive hydrogel; the light intensity sensor and the light source are arranged at two ends of the strip-shaped transparent conductive hydrogel, respectively; the resistance detection module is connected to the two ends of the strip-shaped transparent conductive hydrogel; a longitudinal section of the strip-shaped transparent conductive hydrogel is in a form of a rectangle with unequal length and width.

9 Claims, 11 Drawing Sheets

FLEXIBLE SENSOR AND METHOD OF DETECTING BIAXIAL WRIST JOINT MOTION, AND ROBOTIC ARM

CROSS-REFERENCE TO RELATED APPLICATIONS

This application claims priority to Chinese Patent Application No. 202411196770.8, filed on Aug. 29, 2024, the contents of which are hereby incorporated by reference.

TECHNICAL FIELD

The present disclosure relates to motion detection by flexible sensors and robotic arm, and specifically relates to a flexible sensor and a method of detecting biaxial wrist joint motion, and a robotic arm.

BACKGROUND

Flexible sensors are widely used in the field of motion detection, and their advantage lies mainly in their ability to adapt to various complex shapes and dynamic environments. These sensors are widely integrated into detection devices due to their good flexibility in order to monitor human movement, posture changes and motion status in real time, and further to provide accurate data support. Currently, there are problems in the design of flexible sensors such as complex structure, large size and difficult signal decoupling. The current structural design of flexible sensors mainly lies in the mechanism superposition of various single sensor, which makes the overall structure complex, bulky and limited in application. When it is necessary to sense a number of different physical quantities, flexible sensors will have problems, such as signal crosstalk and transmission processing difficulties, which have an impact on the detection accuracy.

Flexible sensors are also of great significance in the process of robotic arm motion detection. Flexible sensors may accurately detect the motion of the robotic arm and provide data support for the control of the robotic arm. Further, there are still many problems in the design of the bionic robotic arm that may completely mimic the movement of the human forearm and wrist joint. The traditional series-connected robotic arm sets servos or motors at the joints to drive the wrist movement, but the joints of the wrist have a large and bulky spatial structure and do not replicate the movement of the human wrist well. Parallel-type robotic arms generally use a spherical parallel mechanism, which has a complex structure, a small working space and is prone to interference.

At present, most of the robotic arms are driven by cylinders, which are complex in design, easy to leak, noisy and difficult to control accurately; some robotic arms replace the pneumatic drive with hydraulic drive, which makes the drive with high power density and smooth movement, but requires liquid medium and complex system and is easy to leak; in addition, the smart material drive is simple in structure and low in energy consumption, but the action speed is slow and the current material performance is limited. Finally, for some wrist joints that are driven by electric motors, the reducer occupies a large volume making the overall structure large and not in line with the bionic requirements. At the same time, in the five-finger drive of the human hand, the arrangement of the driver is also a major problem. At present, the finger driver is placed inside the arm to reduce the volume of the palm and reduce the load on the wrist is highly favored by the designers. However, this design makes the finger movement and wrist movement interfere with each other, i.e., the wrist movement will affect the finger drive and control.

SUMMARY

An objective of the disclosure is to provide a flexible sensor and a method of detecting biaxial wrist joint motion, and a robotic arm On the first hand, the disclosure provides a flexible sensor of detecting biaxial wrist joint motion, including a light-proof sleeve, a protective layer, a strip-shaped transparent conductive hydrogel, a light intensity sensor, a light source, and a resistance detection module; the transparent conductive hydrogel is arranged in an inner cavity of the light-proof sleeve; the protective layer is arranged between an inner side wall of the light-proof sleeve and the transparent conductive hydrogel; the resistance detection module is connected to both ends of the strip-shaped transparent conductive hydrogel; a longitudinal section of the strip-shaped transparent conductive hydrogel is in a form of a rectangle with unequal length and width.

In the working process, both ends of the light-proof sleeve are fixed on a palm and an arm corresponding to a measured wrist joint; through rotation of the wrist joint at different speeds in different directions, the strip-shaped transparent conductive hydrogel bends and stretches, and light intensity values measured by the light intensity sensor and resistance values measured by the resistance detection module change; and according to changes of the light intensity values and the resistance values, a direction of rotation and an angle of rotation of the measured wrist joint are obtained.

Optionally, a very high bond film (VHB film) is used as protective layers. The coating of the VHB film on the outside of the hydrogel may prevent water loss and deterioration of the hydrogel and ensure the stability of the hydrogel.

Optionally, the longitudinal section of the strip-shaped transparent conductive hydrogel has a length-width ratio of (1.5-2.5):1

On the other hand, the disclosure provides a method of detecting biaxial wrist joint motion, and the method uses the above-mentioned flexible sensor of detecting biaxial wrist joint motion. The method of detecting biaxial wrist joint motion is as follows: when the measured wrist joint rotates, the flexible sensor for biaxial motion detection of the wrist joint collects time series data of the light intensity values and the resistance values, and inputs the time series data into a wrist joint rotation detection network; the wrist joint rotation detection network outputs the direction of rotation and the rotation angle of the wrist joint; and a bi-directional long short-term memory depth learning network is used for the wrist joint rotation detection network.

Optionally, the wrist joint rotation detection network includes a forward LSTM network and a backward LSTM network, where both the forward LSTM network and the backward LSTM network include a plurality of hidden layers, and two adjacent hidden layers are connected to each other by residual.

On another hand, the disclosure provides a bionic robotic arm, including an arm support, a palm support, a wrist joint connection assembly, a wrist-driven mechanism, a finger-driven mechanism and multiple bionic fingers; an inner end of the palm support is connected to an end of the arm support through the wrist joint connection assembly; the finger-driven mechanism is used to drive the palm support to rotate in two-degree of freedom; each of the bionic fingers is connected to the palm support and is driven by the finger-driven mechanism for bending and straightening.

The wrist joint connection assembly includes a wrist universal joint cross, a palm base, and an arm base. The wrist universal joint cross is equipped with mutually perpendicular first connecting rods and second connecting rods. The palm base is fixed to the palm support, and the arm base is fixed to the arm support. The palm base and the first connecting rods form first revolute pairs, and the arm base and the second connecting rods form second revolute pairs.

The wrist-driven mechanism includes two unilateral drive assemblies; each of the unilateral drive assemblies includes a motor mounting support, a linear motor, and a spherical-hinge housing; the motor mounting support and the arm support form a first spherical pair; the linear motor is fixed to the motor mounting support; a push-out rod of the linear motor forms a second spherical pair with a side portion of the palm base; centers of rotation of second spherical pairs corresponding to the two unilateral drive assemblies are located on a same side of a axis of rotation of the first revolute pairs, and the centers of rotation of the second spherical pairs corresponding to the two unilateral drive assemblies are located on an opposite side of a axis of rotation of the second revolute pairs.

Optionally, each of the unilateral drive assemblies includes a spherical-hinge support and a spherical-hinge rod. The spherical-hinge support is fixed on the arm support. One end of the motor mounting support is fixedly connected with one end of the spherical-hinge rod. A connecting ball at the other end of the spherical-hinge rod forms a first spherical pair with the spherical-hinge support. The line connecting the centers of rotation of the first spherical pair and the second spherical pair is parallel to or coincides with the direction of motion of the push-out rod of the linear motor.

Optionally, each of the unilateral drive assemblies further includes a flexible sensor, where the flexible sensor is connected between the palm support and the arm support; the flexible sensor includes a light-proof sleeve, a protective layer, a strip-shaped transparent conductive hydrogel, a light intensity sensor and a light source; the transparent conductive hydrogel is arranged in an inner cavity of the light-proof sleeve; the protective layer is arranged between an inner side wall of the light-proof sleeve and the transparent conductive hydrogel; the light intensity sensor and the light source are arranged at two ends of the strip-shaped transparent conductive hydrogel, respectively.

Optionally, each of the bionic fingers includes a spring and a plurality of knuckles; the knuckles include a support knuckle and a plurality of movable knuckles that are respectively rotationally connected in turn from inside to outside; the support knuckle is fixed to the palm support; any three consecutive knuckles correspond to one linkage rod; two ends of the linkage rod are rotationally connected with opposite ends of the two knuckles that are not adjacent to each other in the three consecutive knuckles corresponding to the linkage rod; an axis of rotation between the linkage rod and the knuckles is not coinciding with an axis of rotation between adjacent knuckles.

Optionally, any three consecutive knuckles correspond to two rotation joints; the axis of the linkage rod intersects the line connecting the centers of rotation of its corresponding two rotation joints.

Optionally, the wrist universal joint cross includes an integrated molding center ring and four connecting rods; inner ends of the four connecting rods are connected to an outer circumferential surface of the center ring; the four connecting rods are two first connecting rods aligned and coaxial to each other, and two second connecting rods aligned and coaxial to each other.

The inner end of the palm support is provided with a stringing hole; the stringing hole is aligned with a center hole on the center ring; the support knuckle is provided with a clearance hole connecting to internal spaces of the bionic fingers; the finger-driven mechanism includes a servo mounting table and a plurality of single-finger-driven assemblies; the servo mounting table is fixed on the arm support; a number of the single-finger-driven assemblies is equal and one-to-one with a number of the bionic fingers; each of the single-finger-driven assemblies includes a finger-driven servo, a winch, and a rope; the finger-driven servo is mounted on the servo mounting table; the winch is fixed to an output shaft of the finger-driven servo; one end of the rope is fixed to the winch; the rope passes through the center hole on the center ring, the stringing hole on the palm support, the clearance hole on the support knuckle and internal cavities of the movable knuckles of a corresponding bionic finger; and an outer end of the rope is fixed to a movable knuckle at an end of the corresponding bionic finger.

Optionally, the center hole of the center ring is provided with chamfers with circular arcs at both ends.

Optionally, the bionic fingers are five in number; one of the bionic fingers is connected to the side of the palm of the hand, and the number of movable knuckles is two; and the other four bionic fingers are connected side by side to the outer end of the palm of the hand, and the number of movable knuckles is three in each case.

Optionally, an outer side of the arm support is sleeved and fixed with a housing structure; the palm base is sealingly connected to the housing structure of the arm support by an elastic structure.

A drive method of the above-mentioned bionic robotic arm includes:
controlling two linear motors to extend synchronously or shorten synchronously, so as to drive a palm support to rotate around an axis of rotation of first revolute pairs, when the palm support needs to be driven to flip up and down;
controlling one of the linear motors to extend and another linear motor to shorten synchronously, so as to drive the palm support to rotate around an axis of rotation of second revolute pairs, when the palm support needs to be driven to swing left and right;
during movement of the palm support, collecting light intensity signals and resistance signals in real time by a flexible sensor of detecting biaxial wrist joint motion and determining a direction of rotation and an angle of rotation of the palm support according to the measured light intensity signals and the resistance signals;
driving corresponding the bionic fingers to bend or straighten by a finger-driven mechanism, when some or all of the bionic fingers needs to be driven to move.

The disclosure has the following effects.

In the present disclosure, the direction of rotation and angle of rotation of the wrist joint are obtained by using the changes in light transmission and resistance when the strip-shaped transparent conductive hydrogel with inconsistent length and width of longitudinal section is bent and stretched. This helps to simplify the structure of flexible sensor for wrist joint two-degree of freedom motion detection. Moreover, a bi-directional long short-term memory depth learning algorithm (BiLSTM) is used to decouple the time series signals measured by the flexible sensor of detecting biaxial wrist joint motion, so as to obtain the direction of rotation and angle of rotation of the wrist joint quickly and accurately. Further, by using residual connections between hidden layers, the training process of BiLSTM is improved, convergence is accelerated, performance is improved and the risk of over-fitting is reduced, and the model may learn complex function mapping more effectively. In the present disclosure, the universal joint cross is used to connect the palm support and the arm support, and the two linear motors move in the same direction and reverse direction to drive the palm support to flip up and down and swing left and right respectively, so as to simplify the design of the wrist part of the drive. Moreover, through the linear motors, the universal joint cross at the wrist joint is directly driven to realize the rotation of the wrist. This design simplifies the control process, ensures the control accuracy and makes the structure simpler, more compact and space-saving. In this disclosure, the finger-driven mechanism is integrated in the arm support to drive the bionic fingers by wire; a center hole is arranged in the wrist universal joint cross, and the rope passes through the center hole, so that the rope passes through the center of rotation of the palm support, which avoids the situation where the rotation of the palm support affects the drive-by-wire of the bionic fingers. Moreover, by integrating all power components on the arm support, the complete decoupling between the wrist joint drive and the finger joint drive is realized, the control logic of the bionic robotic arm with multi-degree of freedom is simplified and the control precision is improved. Through this design, on the one hand, the size of the palm of robotic arm is reduced to better fit the actual human hand size, and on the other hand, the weight of the palm part is reduced to reduce the load and inertia of the wrist drive to prevent damage to the wrist drive. The present disclosure is capable of accomplishing various movements and functions of the human arm, has the advantages of high efficiency, simple structure, small size and light weight, facilitates the integration between the bionic robotic arm and the robot, and helps the bionic robot to better realize the movement and grasping of the arm. Further, this disclosure realizes precise control of wrist movement by highly integrating the control of the wrist with external flexible sensors, while the flexible sensors may realize precise motion detection of bi-directional bending of the wrist.

DESCRIPTION OF EMBODIMENTS

In order to make the objective, technical solutions and advantages of the embodiments of the present disclosure clearer, the technical solutions in the embodiments of the present disclosure will be clearly described below in conjunction with the drawings in the embodiments of the present disclosure.

Embodiment 1

A flexible sensor of detecting biaxial wrist joint motion is capable of flipping up and down and swinging left and right. The upward flip indicates that the palm of the hand is flipped in a direction close to the back of the hand; the downward flip indicates that the palm of the hand is flipped in a direction away from the back of the hand; the left swing indicates that the palm of the hand is swung in a direction close to the thumb; and the right swing indicates that the palm of the hand is swung in a direction close to the little thumb.

Figure 1:
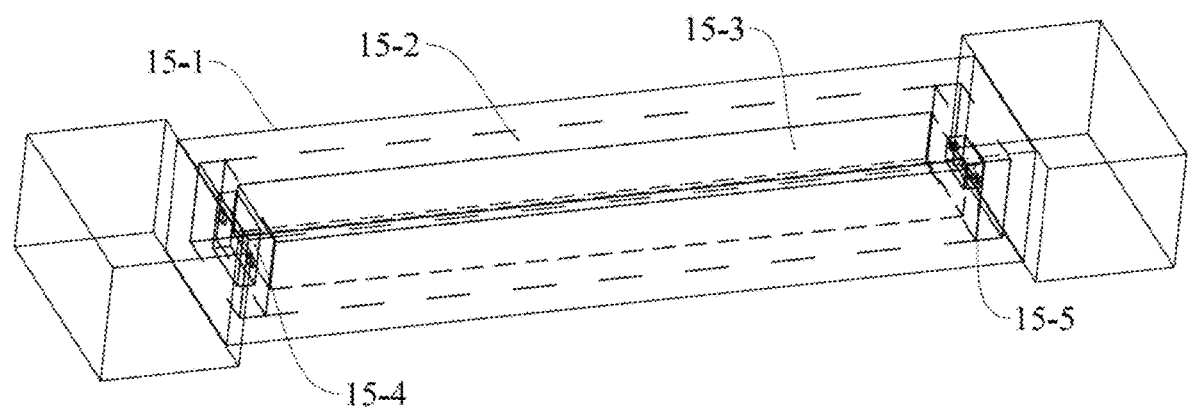
FIG. 1 shows a schematic diagram of a structure of embodiment 1 of the present disclosure.

As shown in FIG. 1, the flexible sensor 15 includes a light-proof sleeve 15-1, a protective layer 15-2, a strip-shaped transparent conductive hydrogel 15-3 (45 mm in length, 6 mm in width, and 3 mm in height), a light intensity sensor 15-4, a light source 15-5, and a resistance detection module 15-6. The light source 15-5 uses SMD LED lamp; light intensity sensor 15-4 uses SMD photodiode. The protective layer 15-2 uses a very high bond film (VHB film) for preventing the strip-shaped transparent conductive hydrogel 15-3 from losing water. The rectangular-shaped transparent conductive hydrogel is arranged in the inner cavity of the light-proof sleeve 15-1. The protective layer 15-2 is provided between the inner side wall of the light-proof sleeve 15-1 and the transparent conductive hydrogel. The light intensity sensor 15-4 and the light source 15-5 are provided at the two ends of the transparent conductive hydrogel, respectively.

The light-proof sleeve 15-1 is formed by pouring for avoiding the influence of an external light source on the light signal. To facilitate installation, rectangular installation blocks are poured at both ends of the light-proof sleeve 15-1 of the flexible sensor 15. In the detection process, the two rectangular installation blocks are fixed with the palm and the arm, respectively, and the axis of the flexible sensor 15 is staggered from the center of rotation of the palm, so that the flipping and swinging of the palm may lead to the telescopic deformation of the flexible sensor 15.

The longitudinal section of the strip-shaped transparent conductive hydrogel 15-3 is a rectangle with unequal length and width. In this embodiment, the wide-side (i.e., the length side) of the longitudinal section of the strip-shaped transparent conductive hydrogel 15-3 is parallel to the left-right swing direction of the palm, and the narrow-side (the width side) is parallel to the up-down flip direction of the palm.

When the flexible sensor 15 is bionically bent, the photoresistance between the light intensity sensor 15-4 and the light source 15-5 changes (specifically, the number of times the reflection of light changes), and the resistance of the strip-shaped transparent conductive hydrogel 15-3 changes bionically, so that the bending direction and bending angle of the palm relative to the arm may be inferred from the light intensity measured by the light intensity sensor 15-4 and the resistance value measured by the resistance detection module 15-6.

The resistance detection module 15-6 is connected to both ends of the strip-shaped transparent conductive hydrogel 15-3 for detecting the change in resistance value of the strip-shaped transparent conductive hydrogel 15-3. The resistance detection module obtains the change in resistance value of the strip-shaped transparent conductive hydrogel 15-3 by connecting a voltage divider resistor in series with the strip-shaped transparent conductive hydrogel 15-3 and detecting the resistance value of the voltage divider resistor.

The sensor undergoes wide-side bending and stretching during the forward swinging motion of the bionic robotic arm; the sensor undergoes wide-side bending during the backward swinging motion of the bionic robotic arm; and the sensor undergoes narrow-side bending during the left-right swinging motion of the bionic robotic arm. In the uniform motion, when the sensor stretches and deforms, the resistance value of the hydrogel inside the sensor becomes larger with the increase of the stretching amount; when the sensor undergoes wide-side bending and narrow-side bending, the signals generated by the wide-side bending and the signals generated by narrow-side bending have different ranges and rates of change due to the rectangular design of the optical channel. According to the above signal features of the sensor, the corresponding signal acquisition circuit is designed to perform the signal change between the photoelectric signal and the water condensation signal. The acquired signals are input into the algorithm improved BiLSTM algorithm for decoupling and prediction. When the sensor is in stretching-bending composite deformation, the hydrogel signal is sensitive to the stretching length, but almost insensitive to bending. Although the photoelectric signal is sensitive to both stretching and bi-directional bending, the bi-directional bending angle cannot be directly acquired due to the nonlinear signal response of the photoelectric signal.

Since the height and width of the longitudinal section of the strip-shaped transparent conductive hydrogel 15-3 are not equal, it is thereby possible to determine whether the palm support 2 is undergoing up-down flipping or left-right swinging and to deduce the angle of rotation based on the rate of change in light intensity measured by the light intensity sensor 15-4 and the rate of change in the resistance value measured by the resistance detection module when the speed of swinging of the palm support 2 is fixed.

In this embodiment, combined with the rate of change in the resistance values and an photoelectric sensing mechanism, the flexible sensor 15 is capable of capturing bi-directional bending and tensile deformations, and combined with an algorithm, is capable of decoupling and predicting the angle of bending of the bionic mechanical wrist in the application of the bionic mechanical wrist.

Figure 11:
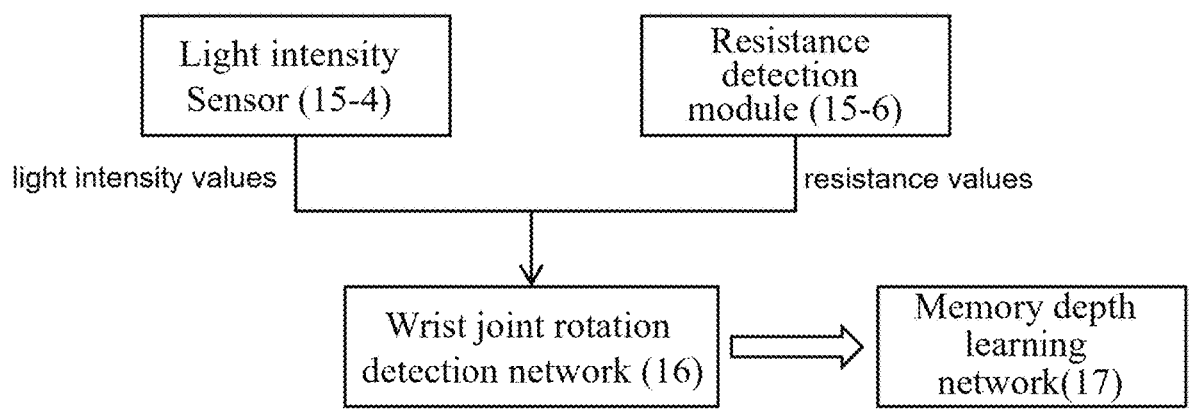
FIG. 11 is a schematic diagram showing a method of detecting biaxial wrist joint motion according to the present application.

A method of detecting biaxial wrist joint motion by using the flexible sensor of detecting biaxial wrist joint motion is as follows (shown in FIG. 11).

S1: Constructing a data set using experimental data obtained from testing on a standard test bench. Each sample in the data set is time series data of light intensity and resistance values collected by the flexible sensor of detecting biaxial wrist joint motion in real time by the signal acquisition circuit; in this embodiment, the time series data is specifically the light intensity and resistance values measured in the first 1 s of the current moment; the sampling period of the flexible sensor of detecting biaxial wrist joint motion is 10 Hz. Each sample has a label. The labels are the real-time rotation direction and rotation angle of the wrist joint. The rotational speed of the wrist joint is kept constant during the experimental data collection, and the rotational speed is the set rotational speed of the wrist joint of the robotic arm.

Based on the data set, a training set and a verification set are constructed. The training set is used to train the model and the verification set is used to evaluate the accuracy of the model.

S2: Constructing a wrist joint rotation detection network 16. A BiLSTM is used for the wrist joint rotation detection network 16. The BiLSTM may capture context information more effectively, and understand the long-term dependence of sequence when checking sequence data. The BiLSTM includes forward LSTM network and backward LSTM network. Both the forward LSTM network and the backward LSTM network include multiple hidden layers. Two adjacent hidden layers are connected to each other by residual. In an implementation mode, a bi-directional long short-term memory depth learning network 17 is used for the wrist joint rotation detection network.

Each hidden layer individually has an input gate, a forgetting gate, and an output gate, which together improve the model's ability to understand and represent sequential data. When using BiLSTM, two independent LSTM networks may be run simultaneously. The forward LSTM network learns the dependencies from the beginning of the sequence to the current time step, while the backward LSTM network learns the dependencies from the end of the sequence to the current time step.

Forward LSTM computation: initializing the hidden state $\vec{h}_t$ and $\vec{c}_t$ cell states of the forward LSTM network to zero or random values; computing the output and state of the forward LSTM network at each time step t from 1 to T. The calculation process of the forward LSTM network is as follows:

1) Forgetting Gate:

$$f_t = \sigma(W_f \cdot [\vec{h}_{t-1}, x_t] + b_f) \quad \text{Formula (1),}$$

where $f_t=1$ means passing through the previous memory, $f_t=0$ means discarding the previous memory, and $x_t$ means the current input;

2) Input Gate $i_t$ and Candidate Cell State $\tilde{C}_t$:

$$i_t = \sigma(W_i \cdot [\vec{h}_{t-1}, x_t] + b_i) \quad \text{Formula (2);}$$

$$\tilde{c}_t = \tanh(W_c \cdot [\vec{h}_{t-1}, x_t] + b_c) \quad \text{Formula (3);}$$

3) Update Unit Status: $\vec{c}_t$:

$$\vec{c}_t = f_t \cdot \vec{c}_{t-1} + i_t \cdot \tilde{c}_t \quad \text{Formula (4);}$$

4) Output Gate $o_t$ and Hidden State $\vec{h}_t$:

$$o_t = \sigma(W_o \cdot [\vec{h}_{t-1}, x_t] + b_o) \quad \text{Formula (5);}$$

$$\vec{h}_t = o_t \cdot \tanh(\vec{c}_t) \quad \text{Formula (6);}$$

5) Residual Connection:

$$\text{Residual Output}_t^l + x_c^l \quad \text{Formula (7),}$$

where denotes the cell state of the LSTM; $W_f$, $W_i$, $W_c$ and $W_o$ are the weight matrices of the forgetting gate, the input gate, the candidate cell state, and the output gate, respectively; $f_t$, $i_t$, $o_t$, $\vec{c}_t$, $\tilde{c}_t$ and $h_t$ denote the forgetting gate, the input gate, the output gate, the candidate cell, the inputs and the recursive information, respectively; $b_f$, $b_i$, $b_c$ and $b_o$ are the bias vectors; a is the sigmoid activation function; tanh is the activation function; the operator "·" denotes dot product of two vectors; Residual Output$_t^l$ denotes the LSTM residual link; is the output of the LSTM layer and t is the input of the layer.

The backward LSTM network computation is similarly to the forward LSTM network computation, but in reverse order. The backward LSTM network computation is performed sequentially from the end to the beginning of the sequence.

The input gate determines whether to include the current input information in the unit state and controls the degree of influence of the input information on the unit state. The forget gate selects which data in the unit state of the previous time step to delete and whether to ignore these data. The output gate selects which information to send to the next layer of the network and how many cell states at the current time step to transmit to the hidden state. These three gates work together to identify and preserve patterns and structures in sequential data, and thereby to help them better control the flow of information. By combining the hidden state of the forward LSTM network with the hidden state of the backward LSTM network at the corresponding time by using BiLSTM, the following results may be obtained.

$$z_t = W_z[\overrightarrow{h_t}, \overleftarrow{h_t}] \quad \text{Formula (8)},$$

where t represents the output of the BiLSTM unit, $W_z$ represents the weight vector, and $\overrightarrow{h_t}$ and $\overleftarrow{h_t}$ represent the hidden state output through the forward transmission path and the reverse transmission path, respectively.

In this embodiment, two independent LSTM networks in the BiLSTM algorithm are improved by residual connection. Residual connection may improve the training process, accelerate convergence, improve performance and reduce the risk of over-fitting of Deep Learning Model BiLSTM, so that the Deep Learning Model BiLSTM may learn complex function mapping more effectively.

S3: Training the wrist joint rotation detection network 16 by using the training set. Both the number of hidden layers in the forward LSTM network and the number of hidden layers in the backward LSTM network in the wrist joint rotation detection network 16 is 2; the input feature of each hidden layer is 2 and the state feature is 200. Adaptive Moment Estimation (adam) is used as the solver, the maximum number of iterations is 100 and the initial learning rate is set to 0.001. Through the learning of the deep learning algorithm, it is possible to output the corresponding deformation amounts (stretching amount, width bending amount and height bending amount) of the sensor, when the sensor undergoes composite deformation, and at the same time, the movement direction and movement amounts of the bionic robotic arm may be reflected, and further, precise control of wrist movement may be achieved by using the detected amounts of arm movement as feedback information, where the training error decreases with the increase of model Epoch. For example, at Epoch=90, the training error (loss) of S1 is 0.0013, and the training error (loss) of S2 is 0.0057. By comparing the predicted results of the validation set with the original data of the validation set, the accuracy of the predicted results is determined based on the goodness of fit. The goodness of fit of the algorithm's predicted values is as high as 99%.

S4: Collecting light intensity signals and resistance signals in real time by using a flexible sensor of detecting biaxial wrist joint motion, and inputting real-time updated time series data of the light intensity signals and the resistance signals into a wrist joint rotation detection network 16; outputting the current rotation direction and rotation angle of wrist joint by the wrist joint rotation detection network 16, where the set value of the rotational speed of the measured wrist joint is consistent with the rotational speed set in S1.

Figure 2:
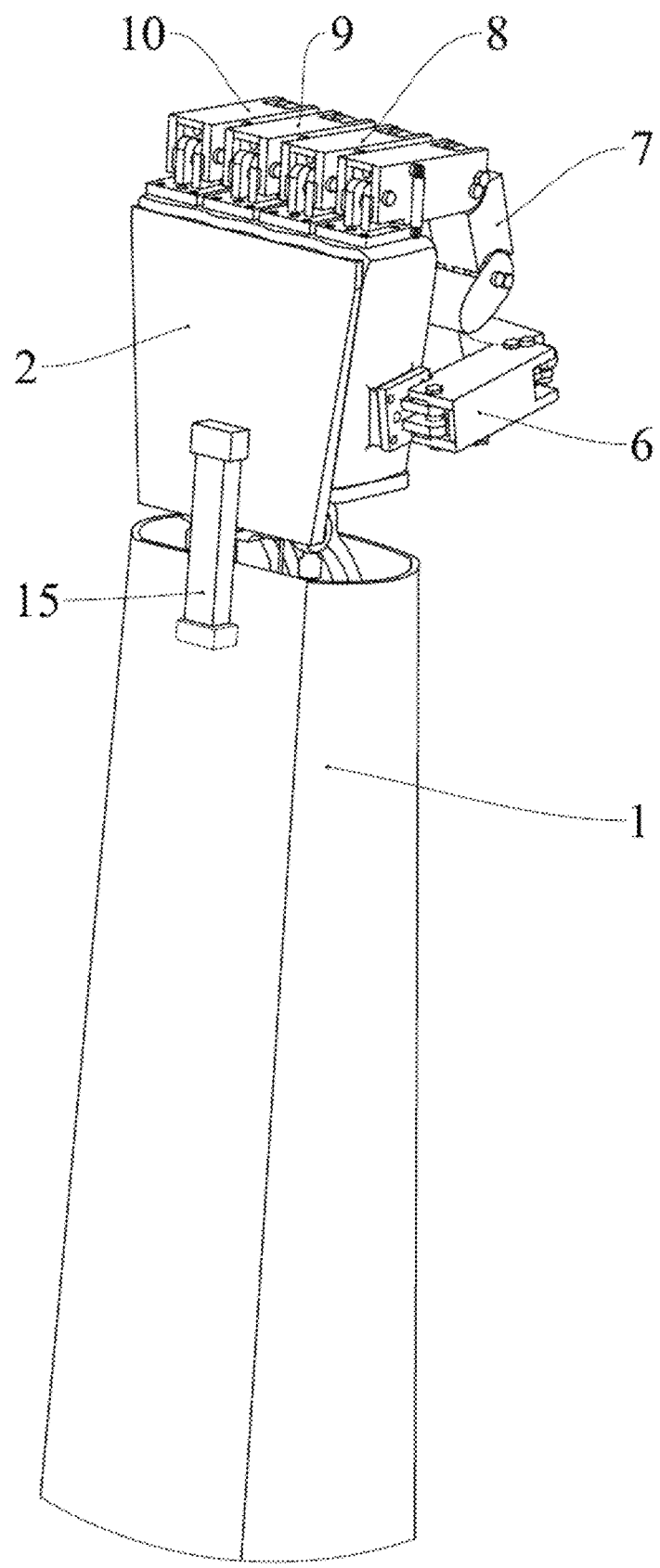
FIG. 2 shows a schematic diagram of an overall structure of embodiment 2 of the present disclosure.
Figure 3:
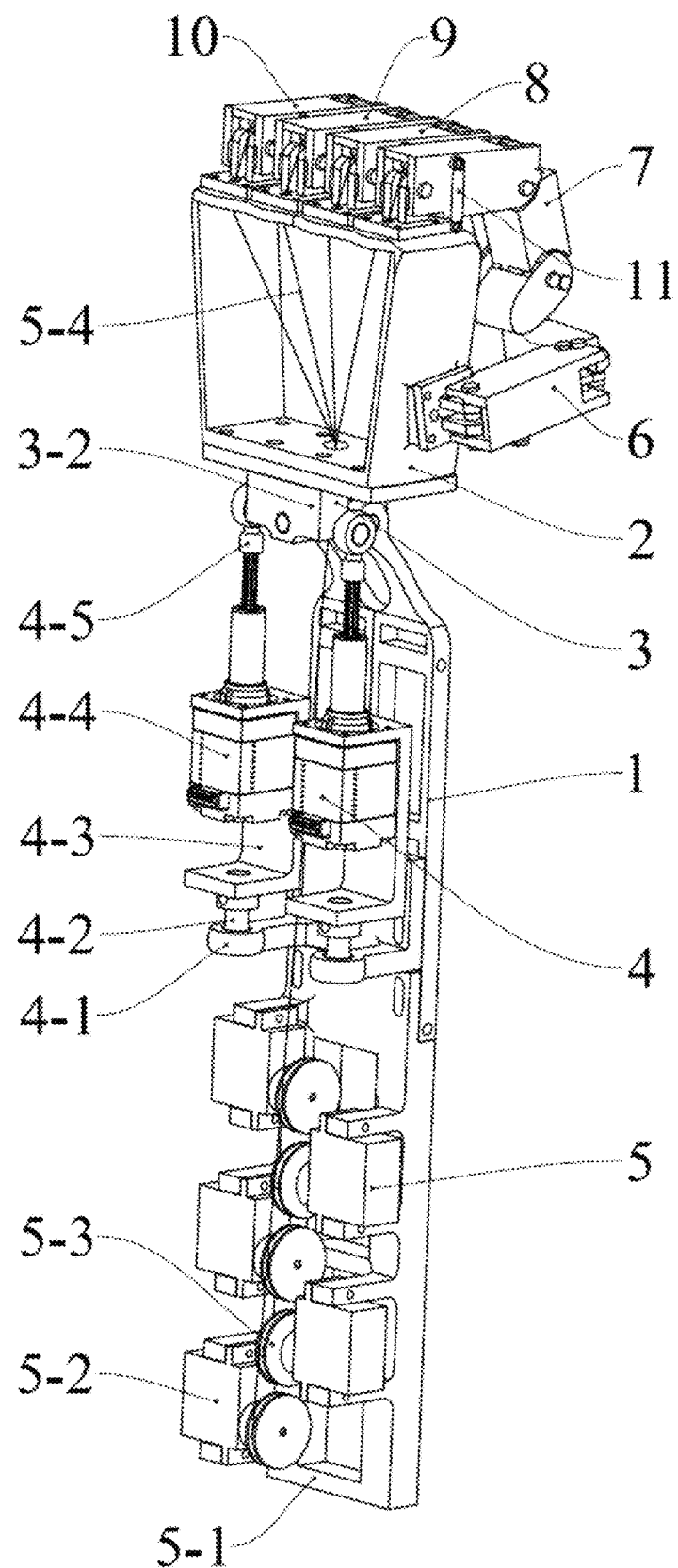
FIG. 3 shows a schematic diagram of an internal structure of a bionic robotic arm in embodiment 2 of the present disclosure.

As shown in FIG. 2 and FIG. 3, a bionic robotic arm includes an arm support 1, a palm support 2, a wrist joint connection assembly 3, a wrist-driven mechanism 4, a finger-driven mechanism 5, a thumb 6, an index finger 7, a middle finger 8, a ring finger 9, a little finger 10, and a flexible sensor 15. An inner end of the palm support 2 is connected to an end of the arm support 1 through the wrist joint connection assembly 3, and further the palm support 2 is allowed to rotate in two-degree of freedom relative to the arm support 1. An outer side of arm support 1 is fixed with an outer shell structure. The edge of the palm support 2 is connected to the end edge of the outer shell structure of the arm support 1 through a cylindrical elastic silicone, so that flexibility and sealing are ensured during wrist rotation. The flexible sensor 15 is connected between the palm support 2 and the arm support 1. In this embodiment, the two rectangular installation blocks on the flexible sensor 15 are respectively fixed to the back of the palm support 2 and the back of the outer shell structure of the arm support 1.

The wrist-driven mechanism 4 is used to drive the palm support 2 to flip in two-degree of freedom. The thumb 6 is connected to the side of the palm support 2; the index finger 7, the middle finger 8, the ring finger 9 and the little thumb 10 are connected side by side to the outer end of the palm support 2; the arrangement of the five fingers is consistent with the left or right hand of the human body. The thumb 6 has two joints. The index finger 7, the middle finger 8, the ring finger 9 and the little thumb 10 have the same structure and all have three joints. The finger driving mechanism 5 is used to independently control the bending and straightening of the thumb 6, the palm support 2, the index finger 7, the middle finger 8, the ring finger 9, and the little thumb 10.

Figure 4:
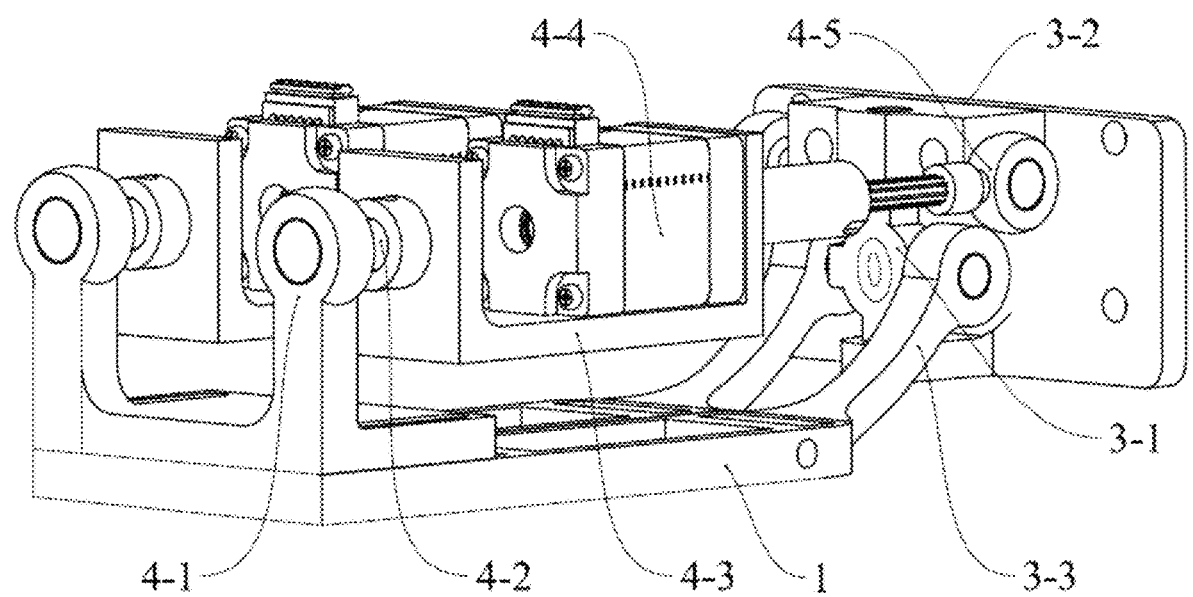
FIG. 4 shows a schematic diagram of a combination of a wrist joint connection assembly and a wrist-driven mechanism in embodiment 1 of the present disclosure.
Figure 5:
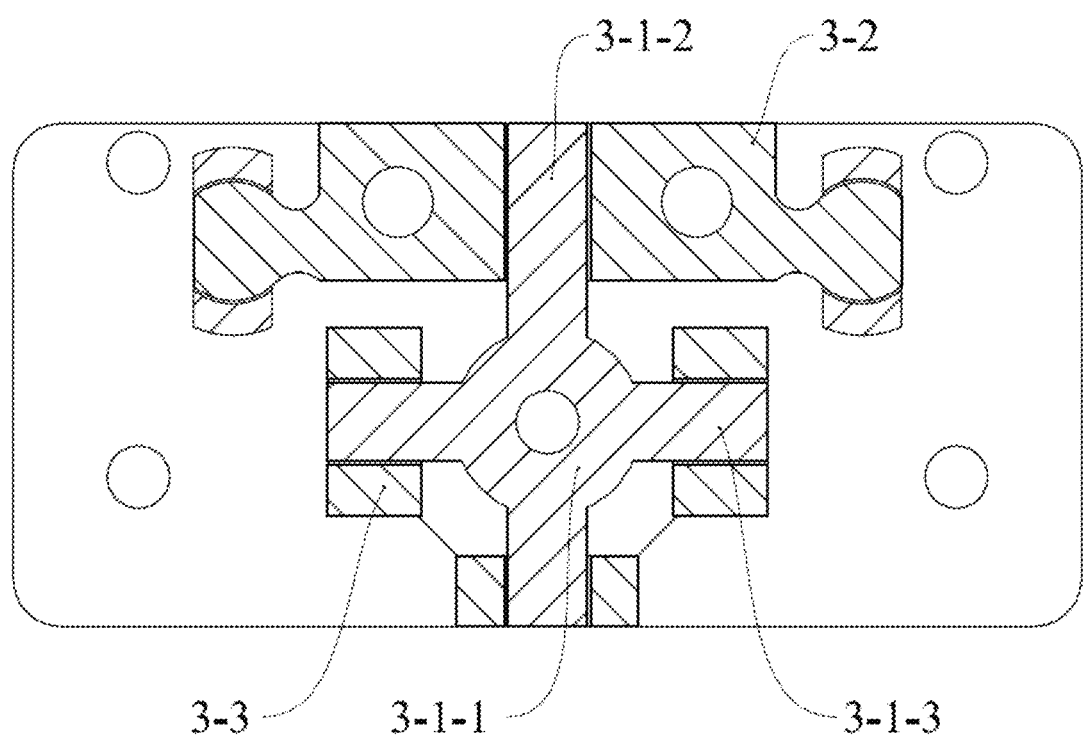
FIG. 5 shows a first schematic sectional view of the wrist joint connection assembly in embodiment 1 of the present disclosure.
Figure 6:
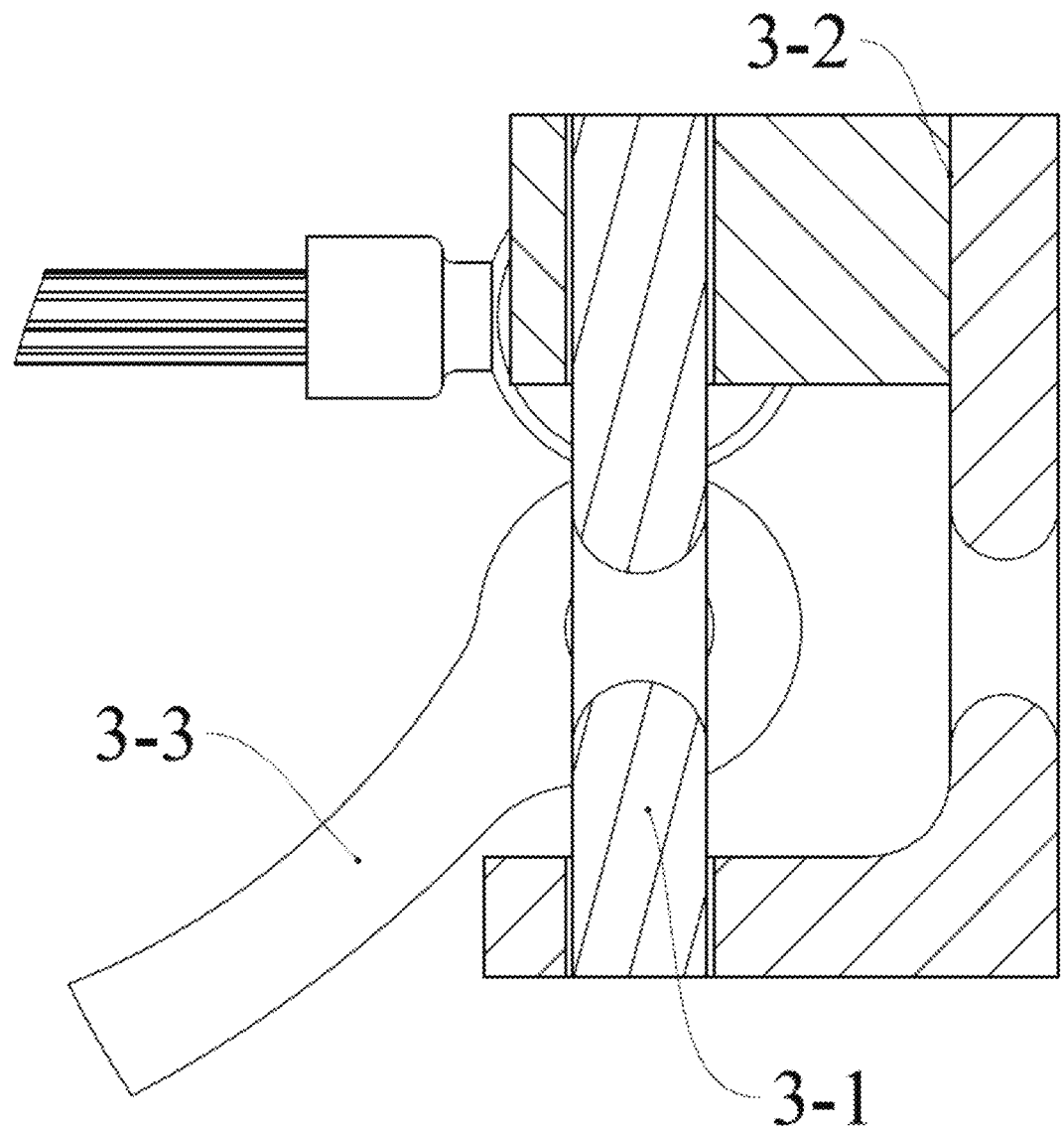
FIG. 6 shows a second schematic sectional view of the wrist joint connection assembly in embodiment 1 of the present disclosure.
Figure 7:
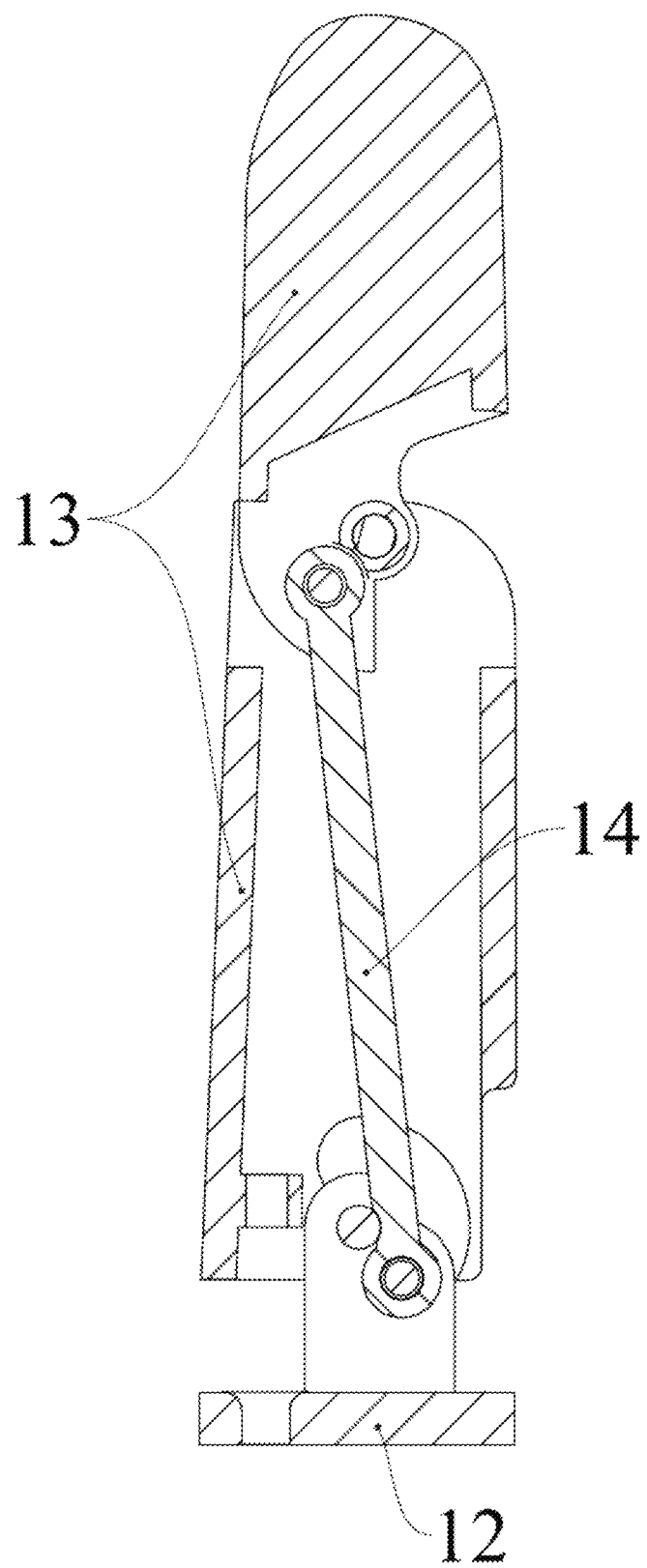
FIG. 7 is a schematic sectional view of a thumb in embodiment 1 of the present disclosure.
Figure 8:
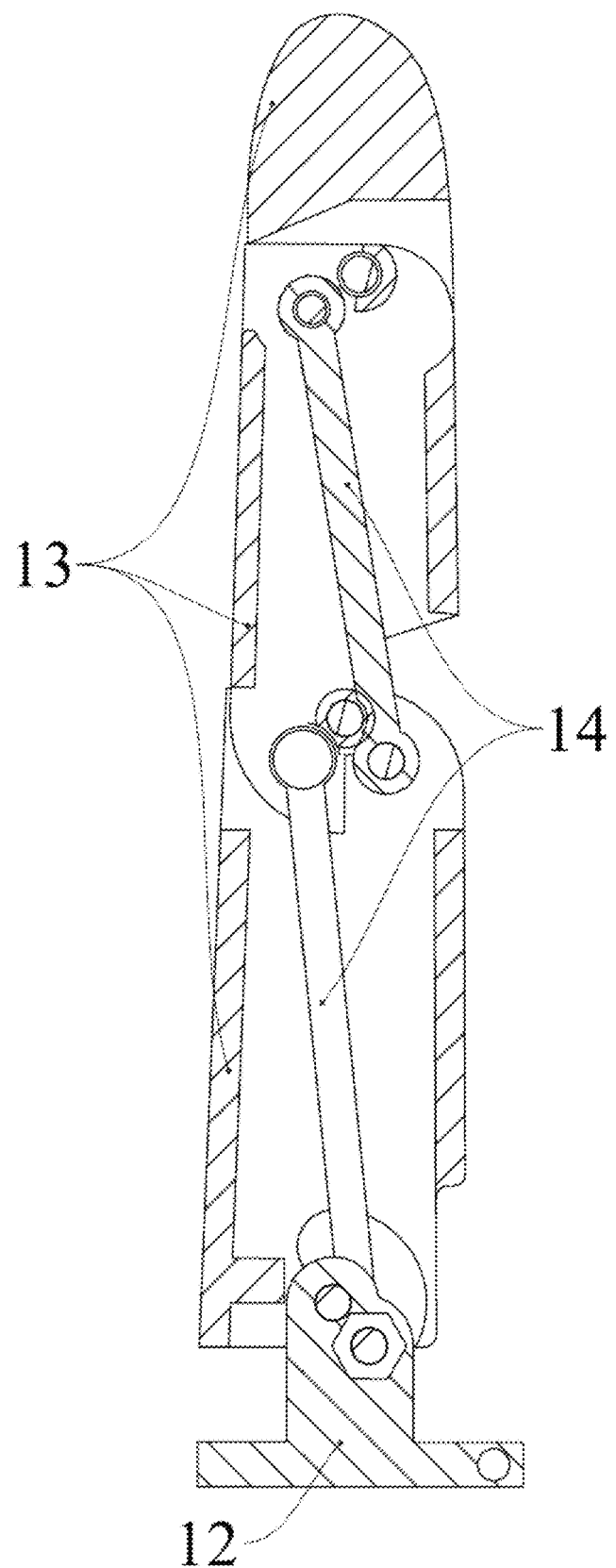
FIG. 8 is a schematic sectional view of an index finger in embodiment 1 of the present disclosure.
Figure 9:
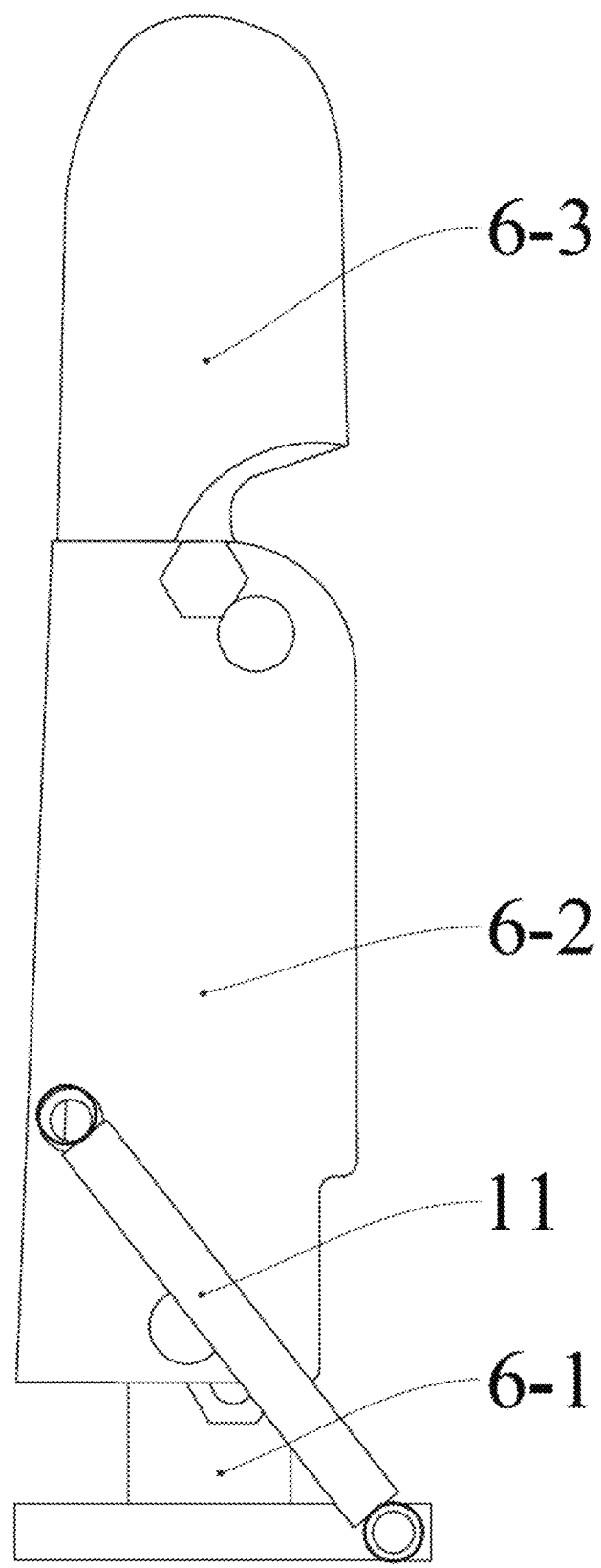
FIG. 9 is a schematic side view of a thumb in embodiment 1 of the present disclosure.
Figure 10:
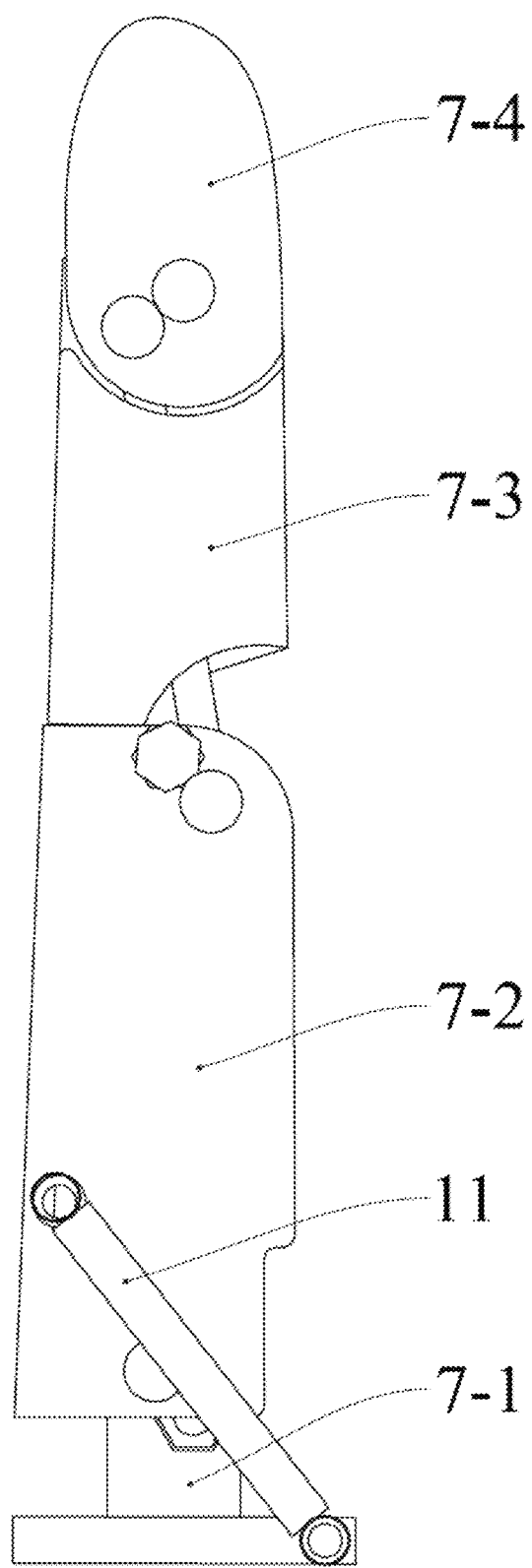
FIG. 10 is a schematic side view of an index finger in embodiment 1 of the present disclosure.

As shown in FIG. 4, FIG. 5, and FIG. 6, the wrist joint connection assembly 3 includes a wrist universal joint cross 3-1, a palm support 2, and an arm support 1. The wrist universal joint cross 3-1 includes an integrated molding center ring 3-1-1 and four connecting rods. The inner ends of the four connecting rods are connected to an outer circumferential surface of the center ring 3-1-1. The four connecting rods are evenly distributed along the center of the center ring 3-1-1 to form a cross-shaped structure. The four connecting rods are two first connecting rods 3-1-2 that are aligned and coaxial to each other, and two second connecting rods 3-1-3 that are aligned and coaxial to each other.

The center hole of the center ring 3-1-1 is provided with chamfer with circular arcs at both ends. The palm base 2 is fixed to the inner end of the palm support 2. The arm base 1 is fixed to an end of the arm support 1.

The wrist-driven mechanism 4 includes two unilateral drive assemblies arranged side by side. The two unilateral drive assemblies drive the palm support 2 to flip up and down when moving in the same direction, and drive the palm support 2 to swing left and right when moving in the opposite direction. Each of the unilateral drive assemblies includes a spherical-hinge support 4-1, a spherical-hinge rod 4-2, a motor mounting support 4-3, a linear motor 4-4, and a spherical-hinge housing 4-5. The spherical-hinge support 4-1 is fixed on the arm support 1. One end of the motor mounting support 4-3 is fixedly connected with one end of the spherical-hinge rod 4-2. A connecting ball at the other end of the spherical-hinge rod 4-2 forms a first spherical pair with the spherical-hinge support 4-1. The housing of the linear motor 4-4 is fixed to the motor mounting support 4-3. An end of a push-out rod of the linear motor 4-4 is mounted with a spherical-hinge housing 4-5, the spherical-hinge housing 4-5 forms a second spherical pair with a side portion of the palm support 2. The line connecting the centers of rotation of the first spherical pair and the second spherical pair is parallel to or coincides with the direction of motion of the push-out rod of the linear motor 4-4.

The centers of rotation of the second spherical pairs corresponding to the two unilateral drive assemblies are located on the same side of the axis of rotation of the first revolute pairs between the palm support 2 and the wrist universal joint cross 3-1, respectively; and the centers of rotation of the second spherical pairs corresponding to the two unilateral drive assemblies are located on the opposite side of the axis of rotation of the second revolute pairs between the arm support 1 and the wrist universal joint cross 3-1, respectively.

As shown in FIG. 7, FIG. 8, FIG. 9, and FIG. 10, the thumb 6, the index finger 7, the middle finger 8, the ring finger 9, and the little finger 10 all include a spring 11 and a plurality of knuckles rotationally connected in sequence. The knuckles of each finger include a support knuckle 12 and a plurality of movable knuckles 13 arranged in sequence from inside to outside. The support knuckle 12 is fixed to the palm support 2; any three consecutive knuckles correspond to a linkage rod 14. Two ends of the linkage rod 14 are respectively rotationally connected with the opposite ends of the two knuckles that are not adjacent to each other in the three consecutive knuckles corresponding to the linkage rod. Any three consecutive knuckles correspond to two revolute joints; an axis of the linkage rod 14 intersects with a line connecting the rotation centers of its corresponding two revolute joints, so that the two revolute joints form a linkage structure of synchronous co-directional rotation.

The thumb 6 is provided with two movable knuckles 13 and only one linkage rod 14; the index finger 7, the middle finger 8, the ring finger 9 and the pinky 10 are all provided with three movable knuckles 13 and two linkage rods 14. Each of the linkage rods 14 enables synchronized and co-directional rotation of the corresponding bionic fingers.

By way of example, the three knuckles of the thumb 6 are a support knuckle, a proximal knuckle and a distal knuckle of the thumb 6. The four knuckles of the index finger 7 are a support knuckle, a proximal knuckle, a middle knuckle and a distal knuckle of the index finger 7.

The palm support 2 has a frame structure with a cavity in the center. A stringing hole is provided at the center of the inner end of the palm support 2. The stringing hole is aligned with a center hole in the wrist universal joint cross 3-1.

The finger-driven mechanism 5 includes a servo mounting table 5-1 and five single-finger-driven assemblies. The servo mounting table 5-1 is bolted to the arm support 1. The five single-finger-driven assemblies correspond to the thumb 6, the index finger 7, the middle finger 8, the ring finger 9, and the little finger 10, respectively. Each of the single-finger-driven assemblies includes a finger-driven servo 5-2, a winch 5-3, and a rope 5-4. The finger-driven servo 5-2 is mounted on the servo mounting table 5-1; the winch 5-3 is fixed to the output shaft of the finger-driven servo 5-2; one end of the rope 5-4 is fixed to the winch 5-3. The rope 5-4 passes sequentially through the center hole on the wrist universal joint cross 3-1, the stringing hole and the internal cavity on the palm support 2, a clearance hole on the support knuckle 12 of the corresponding finger, the internal cavities of the movable knuckles 13 of the corresponding finger, and one end of the rope 5-4 is fixed to the outermost movable knuckle 13. The finger-driven servo 5-2 to drive the winch 5-3 for rewinding and unwinding of the rope 5-4 by forward and reverse rotation. The finger-driven servo 5-2 drives the winch 5-3 through forward and reverse rotation for retraction and release of the rope 5-4.

Since axes of the rotation of the two rotation degrees of freedom (i.e., the first revolute pairs and the second revolute pairs) of the palm support 2 pass through the center hole of the wrist universal joint cross 3-1, and the rope 5-4 passes through the center hole of the wrist universal joint cross 3-1, the two-degree of freedom rotation of the palm support 2 has no effect on the length of the rope 5-4 between the wrist universal joint cross 3-1 and the winch 5-3, and the length of the rope 5-4 between the wrist universal joint cross 3-1 and the fingertips of the bionic fingers; this avoids the situation where the rotation of the palm support 2 affects the drive-by-wire of the bionic fingers, realizes the complete decoupling between the wrist joint drive and the finger joint drive, while all the power components are integrated in the arm support 1, simplifies the control logic of the bionic robotic arm with multi-degree of freedom and improves the control precision.

During the working process, the bionic fingers are straightened and bent by controlling the forward and reverse rotation of the five finger-driven servos 5-2, and further the grasping movement of the hand is realized.

In this embodiment, the universal joint cross is used to connect the palm support and the arm support, and the two linear motors move in the same direction and reverse direction to drive the palm support to flip up and down and swing left and right respectively, so as to simplify the design of the wrist part of the drive. Moreover, through the linear motors, the universal joint cross at the wrist joint is directly driven to realize the rotation of the wrist. This design simplifies the control process, ensures the control accuracy and makes the structure simpler, more compact and space-saving.

In addition, the parts used in this disclosure are mostly general-purpose parts with simple and flexible structure, and may perfectly realize the imitation of human arm movement. At the same time, a flexible sensor integrated externally detects the movement of the robotic wrist. Compared to other wrist mechanism, the wrist mechanism is structurally complete, fully functional, may provide high torque and large angle movement, alignment is concentrated in the position of non-interference with the structure of the compact structure on the control is convenient.

The drive method of this bionic robotic arm support 1 is as follows:

controlling the two linear motors 4-4 synchronously to extend or shorten, so as to drive the palm support 2 to rotate around the axis of rotation of the first revolute pairs, when the palm support 2 needs to be driven to flip up and down; and controlling one of the linear motors 4-4 to extend and the other linear motor 4-4 to shorten synchronously, so as to drive the palm support 2 to rotate around the axis of rotation of the second revolute pairs, when the palm support 2 needs to be driven to swing left and right.

During the movement of the palm support 2, the flexible sensor of detecting biaxial wrist joint motion collects light intensity signals and resistance signals in real time and generates time series data to be input into the wrist joint rotation detection network 16, and the wrist joint rotation detection network 16 outputs the direction of rotation and the angle of rotation of the palm support 2. The set value of the rotation speed of the palm support 2 is consistent with the rotation speed of the wrist joint when the training set of the wrist joint rotation detection network 16 is sampled.

When one or more bionic fingers need to be driven to carry out grasping or releasing movements, the finger-driven servo 5-2 corresponding to bionic fingers that need to move rotates to drive the rope 5-4 to retract or release, so as to drive the bionic fingers to bend or straighten, and further to realize the independent movement and grasping movement of each bionic finger.

What is claimed is:

1. A method of detecting biaxial wrist joint motion, using a flexible sensor of detecting biaxial wrist joint motion comprising a light-proof sleeve, a protective layer, a strip-shaped transparent conductive hydrogel, a light intensity sensor, a light source, and a resistance detection module; the transparent conductive hydrogel is arranged in an inner cavity of the light-proof sleeve; the protective layer is arranged between an inner side wall of the light-proof sleeve and the transparent conductive hydrogel; the light intensity sensor and the light source are arranged at two ends of the strip-shaped transparent conductive hydrogel, respectively; the resistance detection module is connected to the two ends of the strip-shaped transparent conductive hydrogel; a longitudinal section of the strip-shaped transparent conductive hydrogel is a rectangle with unequal length and width;

in a working process, two ends of the light-proof sleeve are fixed on a palm and an arm corresponding to a measured wrist joint; through rotation of the wrist joint at different speeds in different directions, the strip-shaped transparent conductive hydrogel bends and stretches, and light intensity values measured by the light intensity sensor and resistance values measured by the resistance detection module change; and according to changes of the light intensity values and the resistance values, a direction of rotation and an angle of rotation of the measured wrist joint are obtained;

the method of detecting biaxial wrist joint motion is as follows: when the measured wrist joint rotates, the flexible sensor of detecting biaxial wrist joint motion collects time series data of the light intensity values and the resistance values, and inputs the time series data into a wrist joint rotation detection network; the wrist joint rotation detection network outputs the direction of rotation and the rotation angle of the wrist joint; and a bi-directional long short-term memory depth learning network is used for the wrist joint rotation detection network.

2. The method of detecting biaxial wrist joint motion according to claim 1, wherein the longitudinal section of the strip-shaped transparent conductive hydrogel has a length-width ratio of (1.5-2.5):1.

3. The method of detecting biaxial wrist joint motion according to claim 1, wherein the wrist joint rotation detection network comprises a forward LSTM network and a backward LSTM network; both the forward LSTM network and the backward LSTM network comprise a plurality of hidden layers, and two adjacent hidden layers are connected to each other by residual.

4. A bionic robotic arm, comprising an arm support, a palm support, a wrist joint connection assembly, a wrist-driven mechanism, a finger-driven mechanism and multiple bionic fingers; an inner end of the palm support is connected to an end of the arm support through the wrist joint connection assembly; the finger-driven mechanism is used to drive the palm support to rotate in two-degree of freedom; each of the bionic fingers is connected to the palm support and is driven by the finger-driven mechanism for bending and straightening; wherein the bionic robotic arm further comprises a flexible sensor of detecting biaxial wrist joint motion, the flexible sensor of detecting biaxial wrist joint motion comprises a light-proof sleeve, a protective layer, a strip-shaped transparent conductive hydrogel, a light intensity sensor, a light source, and a resistance detection module; the transparent conductive hydrogel is arranged in an inner cavity of the light-proof sleeve; the protective layer is arranged between an inner side wall of the light-proof sleeve and the transparent conductive hydrogel; the light intensity sensor and the light source are arranged at two ends of the strip-shaped transparent conductive hydrogel, respectively; the resistance detection module is connected to both ends of the strip-shaped transparent conductive hydrogel; a longitudinal section of the strip-shaped transparent conductive hydrogel is a rectangle with unequal length and width;

in a working process, two ends of the light-proof sleeve are fixed on a palm and an arm corresponding to a measured wrist joint; through rotation of the wrist joint at different speeds in different directions, the strip-shaped transparent conductive hydrogel bends and stretches, and light intensity values measured by the light intensity sensor and resistance values measured by the resistance detection module change; and according to changes of the light intensity values and the resistance values, a direction of rotation and an angle of rotation of the measured wrist joint are obtained;

the flexible sensor is connected between the palm support and the arm support; the wrist joint connection assembly comprises a wrist universal joint cross, a palm base and an arm base; the wrist universal joint cross is provided with mutually perpendicular first connecting rods and second connecting rods; the palm base is fixed to the palm support, and the arm base is fixed to the arm support; the palm base forms first revolute pairs with the first connecting rods respectively; and the arm base and the second connecting rods form second revolute pairs;

the wrist-driven mechanism comprises two unilateral drive assemblies; each of the unilateral drive assemblies comprises a motor mounting support, a linear motor, and a spherical-hinge housing; the motor mounting support and the arm support form a first spherical pair; the linear motor is fixed to the motor mounting support; a push-out rod of the linear motor forms a second spherical pair with a side portion of the palm base; centers of rotation of second spherical pairs corresponding to the two unilateral drive assemblies are located on a same side of a axis of rotation of the first revolute pairs, and the centers of rotation of the second spherical pairs corresponding to the two unilateral drive assemblies are located on an opposite side of a axis of rotation of the second revolute pairs.

5. The bionic robotic arm according to claim 4, wherein each of the bionic fingers comprises a spring and a plurality of knuckles; the knuckles comprise a support knuckle and a plurality of movable knuckles rotationally connected in turn from inside to outside; the support knuckle is fixed to the palm support; any three consecutive knuckles correspond to one linkage rod; two ends of the linkage rod are respectively rotationally connected with opposite ends of the two knuckles that are not adjacent to each other in the three consecutive knuckles corresponding to the linkage rod; an axis of rotation between the linkage rod and the knuckles is not coinciding with an axis of rotation between adjacent knuckles.

6. The bionic robotic arm according to claim 5, wherein the wrist universal joint cross comprises an integrated molding center ring and four connecting rods; inner ends of the four connecting rods are connected to an outer circumferential surface of the center ring; the four connecting rods are two the first connecting rods aligned and coaxial to each other, and two the second connecting rods aligned and coaxial to each other;

the inner end of the palm support is provided with a stringing hole; the stringing hole is aligned with a center hole on the center ring; the support knuckle is provided with a clearance hole connecting to internal spaces of the bionic fingers; the finger-driven mechanism comprises a servo mounting table and a plurality of single-finger-driven assemblies; the servo mounting table is fixed on the arm support; the single-finger-driven assemblies are equal in number and one-to-one with the bionic fingers; each of the single-finger-driven assemblies comprises a finger-driven servo, a winch, and a rope; the finger-driven servo is mounted on the servo mounting table; the winch is fixed to an output shaft of the finger-driven servo; one end of the rope is fixed to the winch; the rope passes through the center hole on the center ring, the stringing hole on the palm support, the clearance hole on the support knuckle and internal cavities of the movable knuckles of a corresponding bionic finger; and an outer end of the rope is fixed to a movable knuckle at an end of the corresponding bionic finger.

7. The bionic robotic arm according to claim 6, wherein the center hole of the center ring is provided with chamfers with circular arcs at both ends.

8. The bionic robotic arm according to claim 4, wherein an outer side of the arm support is sleeved and fixed with a housing structure; the palm base is sealedly connected to the housing structure of the arm support by an elastic structure.

9. A drive method of the bionic robotic arm according to claim 4, comprising: controlling two linear motors to extend synchronously or shorten synchronously, so as to drive a palm support to rotate around an axis of rotation of first revolute pairs, when the palm support needs to be driven to flip up and down;

controlling one of the linear motors to extend and another linear motor 4-4 to shorten synchronously, so as to drive the palm support to rotate around an axis of rotation of second revolute pairs, when the palm support needs to be driven to swing left and right;

during movement of the palm support, collecting light intensity signals and resistance signals in real time by a flexible sensor of detecting biaxial wrist joint motion and determining a direction of rotation and an angle of rotation of the palm support according to the measured light intensity signals and the resistance signals;

driving corresponding the bionic fingers to bend or straighten by a finger-driven mechanism, when some or all of the bionic fingers needs to be driven to move.

\* \* \* \* \*